United States Patent Office 3,557,160
Patented Jan. 19, 1971

3,557,160
1,2 - METHYLENE - 6,7 - DIFLUOROMETHYL-
ENE AND 1,2;6,7 - BIS(DIFLUOROMETHYL-
ENE) PREGNANES AND PROCESSES FOR
THEIR PREPARATION
Colin C. Beard, Freeport, Grand Bahama Island, and
Alexander D. Cross, Mexico City, Mexico, assignors to
Syntex Corporation, Panama, Panama, a corporation
of Panama
No Drawing. Continuation-in-part of application Ser. No.
634,411, Apr. 11, 1967, which is a continuation-in-part
of application Ser. No. 499,092, Oct. 20, 1965, which
in turn is a continuation-in-part of application Ser. No.
486,226, Sept. 9, 1965. This application Jan. 24, 1969,
Ser. No. 793,878
Int. Cl. C07c *169/30*
U.S. Cl. 260—397.4                                31 Claims

ABSTRACT OF THE DISCLOSURE

This discloses 3-keto-$\Delta^4$-pregnene and 3-keto-$\Delta^4$-19-norpregnene steroid compounds which contain 6,7-methylene, 6,7-monohalomethylene or 6,7-dihalomethylene groupings. It also discloses 3-keto-$\Delta^4$-pregnene steroid compounds which contain 1,2-methylene-6,7-difluoromethylene and 1,2;6,7-bis(difluoromethylene) groupings. These compounds can be optionally substituted at one or more of the C–6, C–9, C–11, C–16, C–17, C–16,17, C–21 and/or C–17,21 positions. Also taught are processes useful for the preparation of these compounds. These compounds are useful in accordance with exhibited corticoid, anti-inflammatory and progestational activities.

---

This is a continuation-in-part of Ser. No. 634,411, filed Apr. 11, 1967, now U.S. Pat No. 3,438,977, which is a continuation-in-part of Ser. No. 499,092, filed Oct. 20, 1965, now abandoned, which is a continuation-in-part of Ser. No. 486,226, filed Sept. 9, 1965, now U.S. Pat. No. 3,338,928.

This invention pertains to novel steroids, in particular to pregnanes and 19-norpregnanes having a cyclopropyl or halocyclopropyl ring fused to the C–6,7 position of the molecule as represented by the following skeletal steroid Formula A in which, for convenience and simplicity, only the novel grouping is depicted, each of X and Y being hydrogen, chloro or fluoro:

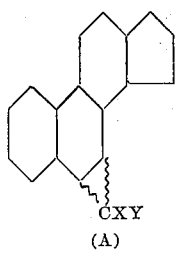
(A)

It also pertains to novel pregnanes having a difluorocyclopropyl group fused to ecah of the C–1,2 and C–6,7 positions of the molecule and to novel pregnanes having a cyclopropyl group fused to the C–1,2 position and a difluorocyclopropyl group fused to the C–6,7 position of the molecule. These compounds are respectively represented by skeletal Formulas B and C:

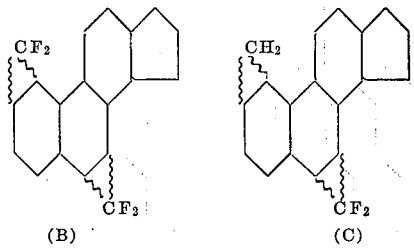

Specifically, this invention is directed at compounds which are diagrammatically represented by Formula I below:

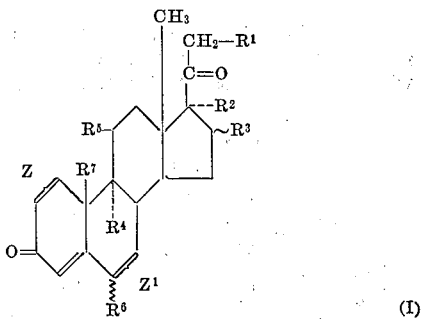

wherein:

$R^1$ is hydrogen, hydroxy, fluoro, chloro, phosphato (including mono- and dialkyl metal salts thereof), tetrahydropyran-2-yloxy, tetrahydrofuran-2-yloxy or a hydrocarbon carboxylic acyloxy group of less than 12 carbon atoms;

$R^2$ is hydrogen, hydroxy, a hydrocarbon carboxylic acyloxy group of less than 12 carbon atoms, or, when taken together with $R^1$, one of groups

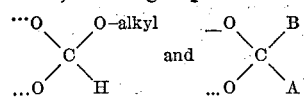

in which A is hydrogen or alkyl of up to eight carbon atoms and B is hydrogen or alkyl or aryl of up to eight carbon atoms;

$R^3$ is hydrogen, methylene, $\alpha$-methyl, $\beta$-methyl, $\alpha$-chloro, $\alpha$-fluoro, $\alpha$-hydroxy and $\alpha$-hydrocarbon carboxylic acyloxy group of less than 12 carbon atoms, or, when taken together with $R^2$, the group

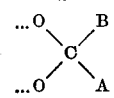

in which A is hydrogen or alkyl of up to eight carbon atoms and B is hydrogen or alkyl or aryl of up to eight carbon atoms;

$R^4$ is hydrogen, chloro or fluoro;
$R^5$ is hydrogen, hydroxy, keto or chloro, $R^4$ and $R^5$ being the same when $R^5$ is hydrogen or chloro;
$R^6$ is hydrogen, methyl, chloro or fluoro;

$R^7$ is hydrogen or methyl;

Z is a carbon-carbon single bond or a carbon-carbon double bond, Z being a single bond when $R^7$ is hydrogen; and $Z^1$ is the group

in which each of X and Y is hydrogen, chloro or fluoro.

More particularly, the present invention is directed to 1,2;6,7-bis(difluoromethylene)-3-keto-$\Delta^4$-pregnenes which can be represented by the Formulas II and III:

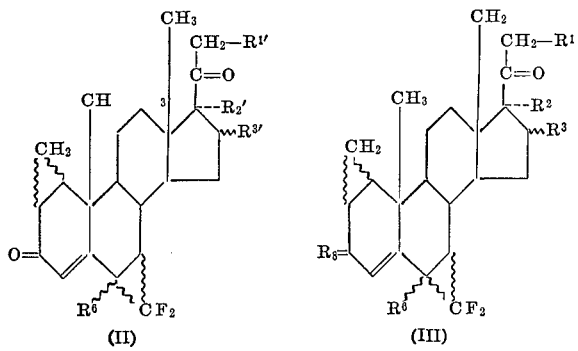

In addition, the present invention is directed to 1,2-methylene-6,7-difluoromethylene - 3 - keto - $\Delta^4$-pregnenes which are represented by Formulas IV and V:

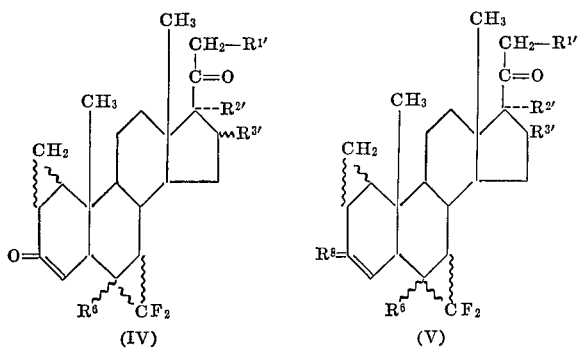

In Formulas II, III, IV and V and succeeding formulas, $R^{1\prime}$ is hydrogen, fluoro or chloro;

$R^{2\prime}$ is hydrogen, hydroxy, or a hydrocarbon carboxylic acyloxy group of less than 12 carbon atoms;

$R^{3\prime}$ is hydrogen, methylene, $\alpha$-methyl, $\beta$-methyl or, when taken together with $R^{2\prime}$, the group

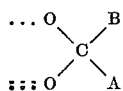

in which A is hydrogen or alkyl of up to eight carbon atoms and B is hydrogen or alkyl or aryl of up to eight carbon atoms;

$R^6$ is hydrogen, methyl, chloro or fluoro; and $R^8$ is the group

in which R is hydrogen, tetrahydrofuran-2-yl, tetrahydropyran-2-yl or a hydrocarbon carboxylic acyl group of less than 12 carbon atoms.

In each of the above formulas and in each of those which follow, the wavy lines ($\{$) denote and include both the alpha and beta configurations of the respective attached groupings.

The hydrocarbon carboxylic acyl and acyloxy groups of the present invention which are referred to in the definitions hereof contain less than 12 carbon atoms and can possess a straight, branched or cyclic chain structure which which is saturated, unsaturated or aromatic and optionally substituted by functional groups, such as hydroxy, alkoxy containing up to five carbon atoms, acyloxy containing up to 12 carbon atoms, nitro, amino, halogeno, and the like. Typical conventional esters thus include acetate, propionate, enanthate, benzoate, trimethylacetate, t-butylacetate, phenoxyacetate, cyclopentylpropionate, aminoacetate, $\beta$-chloropropionate, adamantoate, bicyclo [2.2.2]octane-1-carboxylate, and the like.

Thus, the compounds of the present invention are of the pregnane steroid series which include substituents characteristic of progestational and corticoid steroids and a methylene, monohalomethylene or dihalomethylene grouping fused to the C–6,7 carbon atoms or a difluoromethylene group fused to each pair of the C–1,2 and C–6,7 carbon atoms or a methylene grouping fused to the C–1,2 carbon atoms and a difluoromethylene grouping fused to the C–6,7 carbon atoms.

These compounds demonstrate hormonal properties characterized by corticoid, anti-inflammatory and progestational activity. They are administered in accordance with this activity via any of the normally employed routes including oral, parenteral and topical administrations.

For such administrations, the compounds can be suitably formed into a pharmaceutically acceptable non-toxic composition via the incorporation of any of the usually employed excipients taking the form of powders, capsules, pellets, pills, solutions, creams, ointments, aerosols, and so forth. In addition, they can be administered in conjunction with other medicinal agents depending upon the specific condition being treated.

In administering these compounds, a convenient daily dosage regimen which can be adjusted according to the degree of afflication is employed. Most conditions respond well to treatment in the order of magnitude usually employed in the case of other compounds so used; that is, via a daily dosage unit of from 0.001 mg. to 10 mg. per kg. of body weight, the remainder being an inert vehicle or combination thereof.

In particular, the 1,2;6,7-bis(difluoromethylene) compounds of Formulas II and III and the 1,2-methylene-6,7-difluoromethylene compounds of Formulas IV and V are progestational agents which are useful in the control and regulation of fertility and in the management of various menstrual disorders. Such compounds are also anabolic agents and possess varying degrees of anti-androgenic, anti-estrogenic and anti-gonadotrophic activities.

The synthesis of these compounds is accomplished in a number of ways. For those compounds in which at least one of X and Y is chloro or fluoro, which include the 6,7-difluoromethylene and 1,2:6,7-bis(difluoromethylene) steroids, a 3-keto-$\Delta^{4,6}$-pregnadiene, 3-keto-19-nor-$\Delta^{4,6}$-pregnadiene or a 3-keto-$\Delta^{1,4,6}$-pregnatriene is treated with an alkali metal or alkaline earth metal salt of an acid of the formula W—CXY—COOH in which W is chloro, bromo or iodo, and X and Y are as above defined, with at least one of X or Y being chloro or fluoro, such as bromochloroacetic acid, dichlroacetic acid, trichloroacetic acid, chlorofluoroacetic acid, dichlorofluoroacetic acid, chlorodifluoroacetic acid, and the like. Preferably, the salt employed is an alkali metal salt, such as those of potassium, sodium and lithium.

The use of a dihaloacetate results in the formation of a fused monohalocyclopropyl grouping whereas the use of a trihaloacetate results in the formation of fused dihalocyclopropyl groupings.

The reaction is performed at temperatures above that at which the salt decomposes, as evidenced by the evolution of carobn dioxide, the specific temperature depending upon the particular polyhaloacetate and steroid employed. Thus, in the case of sodium trichloroacetate, a reaction temperature from 80° C. to 150° C. is generally used whereas with sodium chlorodifluoroacetate, a temperature from 150° C. to 180° C. is employed. The reaction is preferably effected in the presence of an inert organic, non-aqueous solvent which is sufficiently polar to dissolve the polyhaloacetate. When the reaction is conducted in the conventional manner at atmospheric pressure, the solvent is selected so that its boiling point is at or above the reaction temperature of the polyhaloacetate, with the reaction being carried out at or below the reflux temperature. Alternatively, the reaction can be conducted under suitable pressure to permit the use of lower boiling solvents. Particularly useful solvents are hydrocarbon polyethers such as dimethoxyethane, dimethyl diethylene glycol ether, dimethyl triethylene glycol ether, and the like. Other solvents include dimethylformamide, dioxane, dimethylsulfoxide, and the like. The reaction time will also vary depending upon the selection of solvent and reagents but may be followed through observation of the ultraviolet absorption spectra, the reaction involving the loss of keto-conjugated unsaturation. Isolation of the product is accomplished via conventional procedures, such as chromatography.

By extending the described reaction conditions, upon completion of addition across the most remote (to the 3-keto group) conjugated double bond, addition continues across the next most remote double bond. Thus, ultilization of a $\Delta^{1,4,6}$ starting compound provides initial addition across the $\Delta^6$ double bond followed by similar addition across the $\Delta^1$ double bond forming the $\Delta^4$ derivative containing the C–1,2;6,7 substitution. The process of this invention can also be carried out on a compound already bearing a halocyclopropyl group. In these manners, the derivatives in the pregnane series having the 1,2;6,7-bis(difluoromethylene) groupings are readily prepared.

In the case where each of X and Y is hydrogen, a 6,7-dichloromethylene or 6,7-chloromethylene compound of the present invention, introduced as outlined above, is reductively dehalogenated as with lithium aluminum hydride in organic solvent. Such a dehalogenation should be followed by an oxidation to regenerate any keto groups which then unprotected are reduced during the treatment with lithium aluminum hydride. Thus, for example, a keto-6,7-dichloromethylene-$\Delta^4$-pregnene is first reductively dehalogenated to a 3-hydroxy-6,7-methylene-$\Delta^4$-pregnene which upon treatment with 2,3-dichloro-5,6-dicyanobenzoquinone yields the corresponding 3-keto-6,7-methylene-$\Delta^4$-pregnene.

Alternatively, those compounds wherein each of X and Y is hydrogen, i.e. the 6,7-methylene derivatives, as well as the 1,2-methylene compounds are prepared by treating a 3-keto-$\Delta^{4,6}$-diene or 3-keto-$\Delta^{1,4}$-diene with dimethylsulfoxonium methylide in dimethylsulfoxide. In the practice of this method, the starting steroid is contacted and maintained with dimethylsulfoxonium methylide (from about 0.9 mole to about 5.0 moles of ylide per mole of steroid), conveniently at about room temperature and for a period of time sufficient to complete the reaction. The dimethylsulfoxonium methylide reactant is preferably prepared "in situ" by reacting trimethylsulfoxonium chloride or iodide in dimethylsulfoxide with an alkali metal hydride, such as potassium or sodium hydride, under an inert atmosphere. Upon adding the staring diene steroid to this mixture containing dimethylsulfoxonium methylide reactant, the inert atmosphere is conveniently maintained for the duration of the reaction.

In the preparation of the 1,2-methylene-6,7-difluoro methylene compounds hereof via the above procedure, the 1,2-methylene group is preferably introduced into a 3-keto-$\Delta^{1,4}$-diene starting steroid as described above. A double bond is then entered between the C–6,7 carbon atoms in the known manner to form the 1,2-methylene-3-keto-$\Delta^{4,6}$-diene compounds. This derivative is then treated with the trihaloacetate salt as described above to form the desired product.

Alernatively, the same 1,2-methylene-6,7-difluoromethylene derivatives can be prepared substantially in the reverse order by first adding the difluoromethylene group at C–6,7 of a 3-keto-$\Delta^{4,6}$-diene steroid followed by the introduction therein of $\Delta^1$ unsaturation in the known method. This 6,7 - difluoromethylene - 3-keto-$\Delta^{1,4}$-diene derivative is then treated with the dimethylsulfoxonium methylide to provide the desired product.

The addition of the methylene, monohalomethylene and dihalomethylene groups in accordance with the procedures set forth herein at positions C–6,7 and C–1,2;6,7 is accomplished with the orientation of the resultant fused grouping including both isomeric alpha and beta configurations in variable ratios. The isomeric product mixture in each instance is conveniently and readily subjected to conventional techniques, such as chromatography, fractional crystallization, and the like, by which the alpha and beta isomers are separated by virtue of their different physical properties. Each isomer or isomeric mixture can thereafter be subjected to further elaboration as desired at other parts of the molecule as hereinafter set forth.

In some instances, one particular configurational isomer predominates in the reaction mixture. Thus, for example, the presence of an 11β-hydroxyl orients the C–6,7-methylene group predominantly to the beta configuration, but does not alter the usual alpha to beta ratio in the halomethylene series. Beta addition in the halomethylene series is favored by the presence of a 9α-halo substituent.

It will be understood that each of the isomers in each series is included within the scope of this invention.

In the practice of this reaction, it is also desirable to protect hydroxy groups through the utilization of derivatives which are easily convertible to hydroxy groups, such as esters and teterahydropyranyl ethers. This preference is not an absolute necessity, however, for while free hydroxy groups will often become involved in side reactions under the conditions of the process, they can be readily regenerated by execution of a mild alkaline hydrolysis after completion of the principal reaction. When each of $R^{2\prime}$ and $R^{3\prime}$ are hydroxy, for example, protection may be realized through formation of the 16α,17α-isopropylidenedioxy derivative.

Starting compounds are chosen which already possess the necessary unsaturation between the C–6,7 carbon atoms or the C–1,2 and C–6,7 carbon atoms for the principal reactions hereof. Other desired elaboration at other parts of the molecule is also preferably present in the starting compounds.

As previously described, the introduction of the 6,7-methylene, 6,7-halomethylene and 1,2;6,7 - bis(difluoromethylene) groups is effected upon compounds already bearing a $\Delta^{4,6}$-diene or $\Delta^{1,4,6}$-triene system. The $\Delta^{4,6}$-diene unsaturation is introduced by treatment of a $\Delta^4$-ene with chlorinal in the presence of ethyl acetate and acetic acid or xylene or t-butanol, the $\Delta^{1,4,6}$-triene unsaturation by treatment of the $\Delta^{4,6}$-diene with chloranil in the presence of (lower)alkanol, such as n-amyl alcohol. Alternatively, the $\Delta^{1,4}$-diene system can be introduced at a stage subsequent to the addition of the 6,7-methylene or -halomethylene grouping, such as with 2,3 - dichloro-5,6-dicyanobenzoquinone. Similarly, the $\Delta^{4,6}$-diene system can be introduced at a stage subsequent to the addition of the 1,2-methylene grouping, as described above. These procedures are particularly convenient in preparing the 1,2-methylene-6,7-difluoromethylene compounds hereof.

21-fluoro, 21-chloro and 21-unsubstituted derivatives are prepared from the corresponding 21-hydroxy compound, obtained upon hydrolysis of the 17α,20;20,21-bismethylenedioxy intermediate with hydrofluoric acid or formic acid. Thus, the 21-hydroxy compound is treated with methanesulfonyl chloride and the resulting ester is converted to the corresponding 21-iodo intermediate by the action of sodium iodide. The 2-iodo intermediate upon the action of silver fluoride or lithium chloride yields the corresponding 21-fluoro or 21-chloro, respectively. Treatment of the 21-iodo intermediate instead with sodium metabisulfite yields the 21-unsubstituted compound. The 21-iodo intermediate can also be obtained from 21-unsubstituted compounds through bromination and treatment with sodium iodide.

With the exception of methylene, the substituents represented by $R^{3'}$ are present in the starting material as qualified above when $R^{2'}$ and $R^{3'}$ are hydroxy. The 16-methylene substituent is introduced after the principal reactions by formation of the 3,20-bis semicarbazone and treatment with acetic acid and pyruvic acid to yield the 3,20-diketo - $\Delta^{16}$-ene. Treatment of this compound with diazomethane and pyrolysis produces the corresponding 16-methyl-$\Delta^{16}$-ene and epoxidation as with perbenzoic acid and ring opening with hydrogen bromide in acetic acid affords the 16-methylene-17-ols.

Tertiary hydroxyl esterification procedures provide the 17α-esters hereof. 16α,17α-acetals and ketals are prepared through treatment of a 16α,17α-dihydroxy compound with a ketone or aldehyde in the presence of an acid, such as perchloric acid. The resulting acetal or ketal, for example, a 16α,17α-isopropylidenedioxy derivative may be utilized as a final compound or as an intermediate, the group being cleaved with regeneration of the diol by the action of hydrofluoric acid.

The substituents represented by $R^6$ are preferably present in the starting material although the 6-fluoro and 6-chloro groups can be introduced upon treatment of the enol ether (prepared from the 3-keto-$\Delta^4$-ene with ethyl orthoformate) with N-chlorosuccinimide and perchloryl fluoride, respectively, followed again by double bond regeneration. The regeneration of the double bond between C-6,7 follows upon treatment of the 3-keto-substituted-$\Delta^4$ derivatives with chloranil to give the corresponding $\Delta^{4,6}$-diene directly or by first forming the enol ether of the 6-substituted componud and treating this with 2,3-dichloro-5,6-dicyanobenzoquinone in the presence of p-toluenesulfonic acid to alternatively give the corresponding $\Delta^{4,6}$-diene compound.

Following the principal reactions hereof, the C-3 position is elaborated by first reducing the 3-keto group, such as with lithium aluminum hydride, sodium borohydride, and the like, in organic solution, such as isopropanol, followed by etherification of the resultant allylic hydroxyl group with dihydropyran or dihydrofuran. This etherification reaction is optionally conducted in the presence of an inert organic solvent, such as benzene, diethyl ether, and the like, and in the presence of small and catalytic amounts of any stable sulfonyl chloride, preferably p-toluenesulfonyl chloride, benzenesulfonyl chloride, methanesulfonyl chloride, p - nitrobenzenesulfonyl chloride, and the like.

The 3β-acylates hereof are prepared upon treatment of the 3β-alcohol (obtained via selective reduction of the keto group as described above) with the appropriate acylating agent conveniently under mild conditions. Useful acylating agents include the corresponding acid anhydrides, such as acetic anhydride and propionic anhydride. Alternatively, the corresponding acyl chloride, such as benzoyl chloride, can be employed. The reaction is usually conducted at from room temperature to about reflux temperature, generally in the presence of pyridine as solvent. Typical acyloxy groups thus introduced in accordance herewith are the hydrocarbon carboxylic acid acyloxy groups listed and defined hereinabove.

The following examples will serve to further typify the nature of this invention. As these are presented solely for the purpose of illustration, they should not be construed as a limitation on the scope of this invention. In some instances, for convenience, the various isomeric forms are specified, however, it will be understood that in any of the reaction steps, both the alpha and beta isomers at C-1,2 and C-6,7 are included within the scope hereof.

EXAMPLE 1

To a suspension of 1 g. of pregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxypregna-3,5(6)-diene-3,20-dione which is recrystallized from acetone:hexane.

To a solution of 1 g. of 3-ethoxypregna-3,5(6)-diene-3,20-dione in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered and diluted with 100 ml. of methylene chloride. The organic phase is separated, washed with 5% aqueous sodium hydroxide solution until the washings are colorless and then with water to neutrality, dried over sodium sulfate, and evaporated to dryness to yield pregna-4,6-diene-3,20-dione which may be further purified through recrystallization from acetone:hexane.

A mixture of 1 g. of pregna-4,6-diene-3,20-dione, 2 g. of chloranil, and 10 ml. of n-amyl alcohol are refluxed under nitrogen for 24 hours. The mixture is then cooled, washed with a cold aqueous solution of 10% sodium hydroxide until the washings are colorless, dried over sodium sulfate and evaporated. Chromatography of the residue on neutral alumina yields pregna-1,4,6-triene-3,20-dione which is further purified through recrystallization from acetone:hexane.

To a gently refluxing solution of 1 g. of pregna-1,4,6-triene-3,20-dione in 20 ml. of dimethyl diethylene glycol ether is added with stirring and in a dropwise fashion a 1:2 w./v. solution of sodium chlorodifluoroacetate in dimethyl diethylene glycol ether. The addition is stopped after the introduction of further reagent fails to substantially change the U.V. spectrum. The mixture is then filtered and evaporated to dryness. The residue thus obtained is chromatographed on alumina and silica with successive portions of methylene chloride:hexane, methylene chloride and methylene chloride:acetone to obtain the 1α,2α;6α,7α - bis(difluoromethylene)pregn-4-ene-3,20-dione, 1β,2β;6β,7β - bis(difluoromethylene)pregn-4-ene-3,20 - dione, 1α,2α;6β,7β-bis(difluoromethylene)pregn-4-ene-3,20-dione, and 1β,2β;6α,7α-bis(difluoromethylene)pregn-4-ene-3,20-dione products.

EXAMPLE 2

A mixture of 1 g. of pregn-4-en-17α-ol-3,20-dione, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 17α-acetoxypregn-4-ene-3,20-dione which is recrystallized from acetone:ether.

To a suspension of 1 g. of 17α-acetoxypregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-17α-acetoxypregna-3,5(6)-dien-20-one which is recrystallized from acetone:hexane.

A mixture of 5 g. of 3-ethoxy-17α-acetoxypregna-3, 5(6)-dien-20-one, 2 g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chcloro-17α-acetoxypregn-4-ene-3,20-dione which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture into water is collected by filtration, washed with water and dried to yield 6α-chloro-17α-acetoxypregn-4-ene-3,20-dione which is recrystallized from acetone:hexane.

A mixture of 1 g. of 6α-chloro-17α-acetoxypregn-4-ene-3,20-dione, 2 g. of chloranil, 15 ml. of ethyl acetate and 5 ml. of acetic acid is refluxed under nitrogen for 96 hours. The mixture is then cooled and washed with cold 10% aqueous sodium hydroxide until the washings were colorless. The organic solution is dried over sodium sulfate and the ethyl acetate removed by evaporation. Upon chromatography of the residue on neutral alumina there is obtained 6-chloro-17α-acetoxypregna-4,6-diene-3,20-dione which may be further purified by recrystallization from acetone:hexane.

A mixture of 1 g. of 6-chloro-17α-acetoxypregna-4,6-diene-3,20-dione, 2 g. of chloranil and 10 ml. of n-amyl alcohol are refluxed under nitrogen for 24 hours. The mixture is then cooled, washed with a cold aqueous solution of 10% sodium hydroxide until the washings were colorless, dried over sodium sulfate and evaporated. Chromatography of the residue on neutral alumina yields 6-chloro-17α-acetoxypregna-1,4,6-triene-3,20-dione which may be further purified through recrystallization from acetone:hexane.

To a stirred and refluxing solution of 1 g. of 6-chloro-17α-acetoxypregna-1,4,6-triene-3,20-dione in 8 ml. of dimethyl diethylene glycol ether is added in a dropwise fashion over a two-hour period, a solution of 30 equivalents of sodium chlorodifluoroacetate in 30 ml. of dimethyl diethylene glycol ether. At the end of the reaction period, which may be followed by the U.V. spectra, the mixture is filtered and evaporated in vacuo to dryness. The residue is chromatographed on silica and alumina, eluting successively with methylene chloride:hexane, methylene chloride and methylene chloride:acetone to obtain the 1α,2α;6α,7α-bis(difluoromethylene)-6β-chloro-17α - acetoxypregn-4-ene-3,20-dione, 1β,2β;6β,7β-bis(difluoromethylene) - 6α - chloro-17α-acetoxypregn-4-ene-3,20-dione, 1α,2α;6β,7β-bis(difluoromethylene)-6α-chloro-17α-acetoxypregn-4-ene-3,20-dione, and 1β,2β;6α,7α-bis(difluoromethylene) - 6β-chloro-17α-acetoxypregn-4-ene-3,20-dione products.

EXAMPLE 3

To a solution of 5 g. of 16α-methylpregn-4-ene-17α,21-diol-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate, and evaporated to dryness to yield 16α-methyl-17α,20;20,21-bis-methylenedioxypregn-4-en-3-one which is recrystallized from methanol:ether.

A mixture of 1 g. of 16 - methyl - 17α,20;20,21 - bis-methylenedioxypregn-4-en-3-one, 2 g. of chloranil, 16 ml. of ethyl acetate and 5 ml. of acetic acid is refluxed under nitrogen for 96 hours. The mixture is then cooled and washed with cold 10% aqueous sodium hydroxide until the washings are colorless. The organic solution is dried over sodium sulfate and the ethyl acetate removed by evaporation. Upon chromatography of the residue on neutral alumina, there is obtained 16α-methyl-17α,20;20,21-bismethylenedioxypregna-4,6-dien-3-one which may be further even purified by recrystallization from acetone:hexane.

A mixture of 1 g. of 16α-methyl-17α,20;20,21-bismethylenedioxypregna-4,6-dien-3-one, 2 g. of chloranil and 10 ml. of n-amyl alcohol are refluxed under nitrogen for 24 hours. The mixture is then cooled, washed with a cold aqueous solution of 10% sodium hydroxide until the washings are colorless, dried over sodium sulfate and evaporated. Chromatography of the residue on neutral alumina yields 16α-methyl-17α,20;20,21-bismethylenedioxypregna-1,4,6-trien-3-one which may be further purified through recrystallization from acetone:hexane.

One gram of 16α-methyl-17α,20;20,21-bismethylenedioxypregna-1,4,6-trien-3-one is dispersed in 8 ml. of dimethyl diethylene glycol ether with stirring. The stirring of the resulting mixture is continued while the temperature thereof is raised to the boiling point and maintained thereafter under reflux. A solution of 30 equivalents of sodium chlorodifluoroacetates dispersed in 30 ml. of dimethyl diethylene glycol ether is added to the refluxing mixture. This addition is conducted in a dropwise fashion over a two-hour period while maintaining stirring. At the end of this time, the reaction mixture is filtered. The filtrate is evaporated in vacuum to a dry residue. The residue is collected and chromatographed on alumina, eluting with methylene chloride to obtain the desired 1,2; 6,7-bis-(difluoromethylene) - 16αmethyl-17α,20;20,21-bismethylenedioxypregn-4-en-3-one products which include the 1α, 2α; 6α,7α, 1β,2β;6α,7α, 1α,2α; 6β,7β, and 1β,2β;6β,7β isomers.

A suspension of 1 g. of 1,2; 6,7-bis(difluoromethylene)-16α - methyl - 17α,20; 20,21-bismethylenedioxypregn-4-en-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 1α,2α; 6α, 7α-bis-difluoromethylene) - 16α-methylpregn-4-ene-17α,21-diol-3, 20-dione as well as the 1β,2β;6α,7α,1α,2α;6β,7β and 1β,2β;6β,7β isomers which are further purified through recrystallization from isopropanol.

To a cooled solution (0° C.) of 3.4 g. of 1α,2α;6α,7α-bis(difluoromethylene - 16α - methylpregn-4-ene-17α,21-diol - 3,20-dione in 20 ml. of 9:1 chloroform:pyridine is added in small portions, 1.4 g. of methanesulfonyl chloride. The mixture is allowed to stand for 14 hours at 0° C. and then washed with dilute hydrochloric acid, water and sodium bicarbonate solution. The chloroform is removed by evaporation under reduced pressure and the residue is dissolved in 20 ml. of acetone and treated at room temperature with stirring with 4 g. of sodium iodide. Sodium thiosulfate solution is added to decolorize the mixture, followed by the addition of water. The solid which forms is collected by filtration and dried in vacuum to yield 1α,2α;6α,7α - bis(difluoromethylene)-16α-methyl-21-iodopregn - 4 - ene - 17α - ol-3,20-dione. This material in 20 ml. of acetonitrile is treated dropwise with 1.4 g. of silver fluoride in 3 ml. of water. The mixture is allowed to stand at room temperature for 24 hours and then filtered. The filtrate is concentrated under vacuum and the residue is dried to yield 1α,2α;6α,7α-bis(difluoromethylene)-16α-methyl-21-fluoropregn-4-ene-17α-ol-3,20-dione which is recrystallized from methanol:acetone.

In accordance with the foregoing procedures, 1α,2α;6β, 7β - bis(difluoromethylene)-16α-methyl-21-fluoropregn-4-ene - 17α - ol - 3,20-dione, 1β,2β;6α,7α-bis(difluoromethylene) - 16α - methyl-21-fluoropregn-4-ene-17α-ol-3,20-dione, and 1β,2β;6β,7β-bis-(difluoromethylene)-16α-methyl-21-fluoropregn-4-ene-17α-ol-3,20-dione also are prepared when utilizing the respective starting compound.

Similarly, the following compounds including the respective alpha and beta isomers separably by chromatography are obtained according to the procedure hereof: 1,2;6,7-bis-(difluoromethylene) - 16β - methyl-21-fluoropregn - 4 - ene - 17α - ol-3,20-dione; 1,2;6,7-bis(difluoromethylene) - 16α - chloro-21-fluoropregn-4-ene-17α-ol-3,20-dione; and 1,2;6,7-bis(difluoromethylene)-16α,21-difluoropregn-4-ene-17α-ol-3,20-dione.

EXAMPLE 4

To a suspension of 1 g. of pregn-4-ene-3,20-dione in 7.5 ml. of anhydrous peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxypregna-3,5,(6)-diene-3,20-dione which is recrystallized from acetone:hexane.

A stream of perchloryl fluoride is passed through a solution of 1 g. of 3-ethoxypregna-3,5,(6)-diene-3,20-dione in 25 ml. of dimethylformamide, cooled to 0° C. for five minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed with water and dried to yield 6α-fluoropregn-4-ene-3,20-dione which is recrystallized from acetone:hexane.

One gram of 6α-fluoropregn-4-ene-3,20-dione and 2 g. of chloranil in 50 ml. of t-butanol are heated at reflux for eight hours. The cooled reaction mixture is filtered and the solid thus separated is washed with a large volume of ethyl acetate. The combined filtrate and washings are in turn washed with cold 10% aqueous sodium hydroxide until the washings are colorless, dried over sodium sulfate and evaporated to dryness to yield 6-fluoropregna-4,6-diene-3,20-dione which may be further purified through chromatography with alumina and recrystallization from methylene chloride:ether.

To a stirred and refluxing solution of 1 g. of 6-fluoropregna-4,6-diene-3,20-dione in 8 ml. of dimethyl diethylene glycol ether is added in a dropwise fashion over a two-hour period, a solution of 30 equivalents of sodium chlorodifluoroacetate in 30 ml. of dimethyl diethylene glycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 6α,7α-difluoromethylene-6β-fluoropregn-4-ene-3,20-dione and 6β,7β - difluoromethylene-6α-fluoropregn-4-ene-3,20-dione.

A mixture of 1 g. of 6,7-difluoromethylene-6-fluoropregn-4-ene-3,20-dione, 2 g. of chloranil and 10 ml. of n-amyl alcohol are refluxed under nitrogen for 24 hours. The mixture is then cooled, washed with a cold aqueous solution of 10% sodium hydroxide until the washings were colorless, dried over sodium sulfate and evaporated. Chromatography of the residue on neutral alumina yields 6,7-difluoromethylene-6-fluoropregna - 1,4 - diene-3,20-dione which may be further purified through recrystallization from acetone:hexane.

To a stirred and refluxing solution of 1 g. of 6,7-difluoromethylene-6-fluoropregna-1,4-diene-3,20-dione in 8 ml. of dimethyl diethylene glycol ether is added in dropwise fashion over a two-hour period, a solution of 30 equivalents of sodium chlorodifluoroacetate in 30 ml. of dimethyl diethylene glycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 1α,2α;6α,7α-bis(difluoromethylene) - 6β - fluoropregn - 4 - ene-3,20-dione, 1β,2β;6α,7α-bis(difluoromethylene)-6β-fluoropregn - 4 - ene-3,20-dione, 1α,2α;6β,7β-bis(difluoromethylene)-6α-fluoropregn - 4 - ene-3,20-dione, and 1β,2β;6β,7β - bis(difluoromethylene-6α-fluoropregn-4-ene-3,20-dione.

The 1,2;6,7-bis(difluoromethylene) products thus obtained can also be prepared by introducing the $\Delta^{1,4,6}$ unsaturated system in the 6-fluoropregn-4-ene-3,20-dione intermediate as described above and treating this triene as described in Examples 1, 2, or 3 with sodium chlorodifluoroacetate.

In accordance with the above methods, the following compounds, including each of the respective 1α,2α;6α,7α; 1α,2α;6β,7β; 1β,2β;6α7α; and 1β,2β;6β,7β isomers thereof are prepared:

1,2;6,7-bis(difluoromethylene)-17α-acetoxypregn-4-ene-3,20-dione;
1,2;6,7-bis(difluoromethylene)pregn-4-ene-17α-ol-3,20-dione;
1,2;6,7-bis(difluoromethylene)-16α-methylpregn-4-en-17α-ol-3,20-dione;
1,2;6,7-bis(difluoromethylene)-16β-methylpregn-4-en-17α-ol-3,20-dione;
1,2;6,7-bis(difluoromethylene)-6-methylpregn-4-ene-3,20-dione;
1,2;6,7-bis(difluoromethylene)-6-fluoropregn-4-ene-17α-ol-3,20-dione;
1,2;6,7-bis(difluoromethylene)-6-fluoro-17α-acetoxypregn-4-ene-3,20-dione;
1,2;6,7-bis(difluoromethylene)-6-chloro-16α-methylpregn-4-en-17α-ol-3,20-dione;
1,2;6,7-bis(difluoromethylene)-6-chloro-16α-methyl-17α-acetoxypregn-4-ene-3,20-dione;
1,2;6,7-bis(difluoromethylene)-16β-methyl-21-chloropregn-4-ene-17α-ol-3,20-dione;
1,2;6,7-bis(difluoromethylene)-6,16α-dimethylpregn-4-ene-3,20-dione;
1,2;6,7-bis(difluoromethylene)-6,16β-dimethylpregn-4-en-17α-ol-3,20-dione;
1,2;6,7-bis(difluoromethylene)-6-fluoro-17α-adamantoyloxypregn-4-ene-3,20-dione;
1,2;6,7-bis(difluoromethylene)-6-fluoro-16β-methyl-17α-propionyloxypregn-4-ene-3,20-dione;
1,2;6,7-bis(difluoromethylene)-6,21-difluoro-16-methylene-4-ene-3,20-dione;
1,2;6,7-bis(difluoromethylene)-17α-(n-butyryloxy)-21-fluoropregn-4-ene-3,20-dione;
1,2;6,7-bis(difluoromethylene)-17α-caproyloxypregn-4-ene-3,20-dione;
1,2;6,7-bis(difluoromethylene)-6,16β-dimethyl-21-chloropregn-4-ene-3,20-dione;
1,2;6,7-bis(difluoromethylene)-6,16β-dimethylpregn-4-ene-3,20-dione;
1,2;6,7-bis(difluoromethylene)-6-fluoro-16α-methyl-17α-acetoxypregn-4-ene-3,20-dione;
1,2;6,7-bis(difluoromethylene)-21-chloropregn-4-ene-3,20-dione;

1,2;6,7-bis(difluoromethylene)-6-chloro-17α-(β-chloro-
propionyloxy)pregn-4-ene-3,20-dione; and
1,6;6,7-bis(difluoromethylene)-6-fluoro-16-methylene-
pregn-4-en-17α-ol-3,20-dione.

The 16α-chloro and 16α-fluoro starting materials employed for the above may be obtained in the following manner. 20,21-oxidopregna-4,16-dien-3-one is treated with hydrogen fluoride and then acetic anhydride in the manner described by Magerlein et al., J. Med. Chem. 7, 748 (1964) to yield 16α-fluoro-21-acetoxypregna-4,17-(20)-dien-3-one or with hydrogen chloride and then acetic acid in the manner of Kagan et al., J. Med. Chem. 7, 751 (1964) to yield 16α-chloro-21-acetoxypregna-4,17(20)-dien-3-one. Each of these compounds is then oxidized with osmium tetroxide and N-methylmorpholine oxide-hydrogen peroxide, as described in both of these references, to yield 16α-fluoro-21-acetoxypregn-4-ene-17α-ol-3,20-dione and 16α-chloro-21-acetoxypregn-4-ene17α-ol-3,20-dione, which are hydrolyzed with base to yield the free 21-hydroxy compounds which can be removed or replaced as described above.

EXAMPLE 5

A solution of 0.5 g. of 6,7-difluoromethylene-6-fluoro-pregna-14,-diene-3,20-dione in 5 ml. of dimethylsulfoxide is added to a solution of one equivalent of dimethylsulfoxonium methylide in dimethylsulfoxide, prepared in the manner of Corey et al., JACS 87, 1353 (1965). The mixture is stirred under nitrogen and at room temperature for 20 hours and then at 50° C. for seven hours. Fifty milliliters of water are then added and the resulting mixture extracted four times with 50 ml. portions of ethyl acetate. The combined extracts are washed with water and saturated aqueous sodium chloride solution, dried over sodium sulfate and evaporated to dryness. This residue is then chromatographed on silica, eluting with 1:9 ether:methylene chloride to yield 1α,2α-methylene-6α,7α-difluoromethylene-6β-fluoropregn-4-ene-3,20-dione;
1β,2β-methylene-6α,7α-difluoromethylene-6β-fluoropregn-4-ene-3,20-dione;
1α,2α-methylene-6β,7β-difluoromethylene-6α-fluoropregn-4-ene-3,20-dione; and
1β,2β-methylene-6β,7β-difluoromethylene-6α-fluoropregn-4-ene-3,20-dione.

EXAMPLE 6

A mixture of 0.5 g. of 6α-chloro-17α-acetoxypregn-4-ene-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 6α-chloro-17α-acetoxypregna-1,4-diene-3,20-dione which is further purified by recrystallization from acetone:hexane.

A solution of 0.5 g. of 6α-chloro-17α-acetoxypregna-1,4-diene-3,20-dione in 5 ml. of dimethylsulfoxide is added to a solution of 1 equivalent of dimethylsulfoxonium methylide in dimethylsulfoxide, prepared in the manner of Corey et al., JACS 87, 1353 (1965). The mixture is stirred under nitrogen and at room temperature for 20 hours and then at 50° C. for seven hours. Fifty milliliters of water are then added and the resulting mixture extracted four times with 50 ml. of ethyl acetate. The combined extracts are washed with H₂O and saturated aqueous sodium chloride solution, dried over sodium sulfate and evaporated to dryness. This residue is then chromatographed on silica, eluting with ether:methylene chloride to yield 1α,2α-methylene-6α-chloro-17α-acetoxypregn-4-ene-3,20-dione and 1β,2β-methylene-6α-chloro-17α-acetoxypregn-4-ene-3,20-dione.

A mixture of 1 g. of 1,2-methylene-6α-chloro-17α-acetoxypregn-4-ene-3,20-dione, 2 g. of chloranil, 15 ml. of ethyl acetate and 5 ml. of acetic acid is refluxed under nitrogen for 96 hours. The mixture is then cooled and washed with cold 10% aqueous sodium hydroxide until the washings were colorless. The organic solution is dried over sodium sulfate and the ethyl acetate removed by evaporation. Upon chromatography of the residue on neutral alumin, there is obtained 1,2-methylene-6α-chloro-17α-acetoxypregna-4,6-diene-3,20-dione which may be purified by recrystallization from acetone:hexane.

To a stirring and refluxing solution of 1 g. of 1,2-methylene - 6α-chloro-17α-acetoxypregna-4,6-diene-3,20-dione in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 1α,2α-methylene-6α,7α-difluoromethylene-6β-chloro-17α-acetoxypregn-4-3,20-dione;
1β,2β-methylene-6α,7α-difluoromethylene-6β-chloro-17α-acetoxypregn-4-ene-3,20-dione;
1α,2α-methylene-6β,7β-difluoromethylene-6α-chloro-17α-acetoxypregn-4-ene-3,20-dione; and
1β,2β-methylene-6β,7β-difluoromethylene-6α-chloro-17α-acetoxypregn-4-ene-3,20-dione.

In accordance with the foregoing procedures, the following compounds, including each of the 1α,2α; 6α,7α; 1α,2α; 6β,7β; 1β,2β;6α,7α; and 1β,2β; 6β,7β isomers thereof, are prepared:

1,2-methylene-6,7-difluoromethylenepregn-4-ene-3,20-dione;
1,2-methylene-6,7-difluoromethylene-17α-acetoxypregn-4-ene-3,20-dione;
1,2-methylene-6,7-difluoromethylene-16α-methyl-21-fluoropregn-4-en-17α-ol-3,20-dione;
1,2-methylene-6,7-difluoromethylene-16β-methyl-21-fluoropregn-4-en-17α-ol-3,20-dione;
1,2-methylene-6,7-difluoromethylene-16α-chloro-21-fluoropregn-4-en-17α-ol-3,20-dione;
1,2-methylene-6,7-difluoromethylene-16α,21-difluoropregn-4-en-17α-ol-3,20-dione;
1,2-methylene-6,7-difluoromethylenepregn-4-ene-17α-ol-3,20-dione;
1,2-methylene-6,7-difluoromethylene-16α-methylpregn-4-en-17α-ol-3,20-dione;
1,2-methylene-6,7-difluoromethylene-16β-methylpregn-4-en-17α-ol-3,20-dione;
1,2-methylene-6,7-difluoromethylene-6-methylpregn-4-ene-3,20-dione;
1,2-methylene-6,7-difluoromethylene-6-fluoropregn-4-ene-17α-ol-3,20-dione;
1,2-methylene-6,7-difluoromethylene-6-fluoro-17α-acetoxypregn-4-ene-3,20-dione;
1,2-methylene-6,7-difluoromethylene-6-chloro-16α-methylpregn-4-ene-17α-ol-3,20-dione;
1,2-methylene-6,7-difluoromethylene-6-chloro-16α-methyl-17α-acetoxypregn-4-ene-3,20-dione;
1,2-methylene-6,7-difluoromethylene-16β-methyl-21-chloropregn-4-ene-17α-ol-3,20-dione;
1,2-methylene-6,7-difluoromethylene-6,16α-dimethylpregn-4-ene-3,20-dione;
1,2-methylene-6,7-difluoromethylene-6,16β-dimethylpregn-4-en-17α-ol-3,20-dione;
1,2-methylene-6,7-difluoromethylene-6-fluoro-17α-adamantoyloxypregn-4-ene-3,20-dione;
1,2-methylene-6,7-difluoromethylene-6-fluoro-16β-methyl-17α-propionyloxypregn-4-ene-3,20-dione;

1,2-methylene-6,7-difluoromethylene-6,21-difluoro-16-
methylene-4-ene-3,20-dione;
1,2-methylene-6,7-difluoromethylene-17α-(n-butyryl-
oxy)-21-fluoropregn-4-ene-3,20-dione;
1,2-methylene-6,7-difluoromethylene-17α-caproyloxy-
pregn-4-ene-3,20-dione;
1,2-methylene-6,7-difluoromethylene-6,16β-dimethyl-21-
chloropregn-4-ene-3,20-dione;
1,2-methylene-6,7-difluoromethylene-6,16β-dimethyl-
pregn-4-ene-3,20-dione;
1,2-methylene-6,7-difluoromethylene-6-fluoro-16α-
methyl-17α-acetoxypregn-4-ene-3,20-dione;
1,2-methylene-6,7-difluoromethylene-21-chloropregn-4-
ene-3,20-dione;
1,2-methylene-6,7-difluoromethylene-6-chloro-17α-(β-
chloropropionyloxypregn-4-ene-3,20-dione; and
1,2-methylene-6,7-difluoromethylene-6-fluoro-16-methyl-
enepregn-4-en-17α-ol-3,20-dione.

The 16-methyl and -methylene compounds are prepared as follows.

EXAMPLE 7

To a suspension of 1 g. of 1,2;6,7-bis(disfluoromethylene)-pregn-4-ene-17α-ol-3,20-dione in 27 ml. of methanol and 1 ml. of water, under nitrogen, is added 1.4 g. of semicarbazide hydrochloride and 0.74 g. of sodium bicarbonate. The mixture is heated at reflux for three hours and then at 45 C. for 20 hours. The suspension is cooled and 36 ml. of water are slowly added. The solid is collected by filtration, washed with water and dried to yield 1,2;6,7-bis(difluoromethylene)pregn - 4 - ene - 17α-ol-3,20-bis semicarbazone which is recrystallized from pyridine:methanol.

A solution of 1 g. of 1,2;6,7 - bis(difluoromethylene)-pregn-4-ene-17α-ol-3,20-bis semicarbazone in 20 ml. of acetic acid and 1 ml. of acetic anhydride is heated at reflux under nitrogen for one hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for two hours and is then diluted with water and extracted with chloroform. These extracts are washed with water, dilute potassium bicarbonate solution and water, dried over magnesium sulfate, and evaporated to dryness under reduced pressure. The residue is chromatographed on neutral alumina with benzene to yield 1,2; 6,7-bis(difluoromethylene)-pregna-4,16-diene-3,20-dione which may be recrystallized from acetone:ether.

A solution of 1 g. of 1,2;6,7-bis(difluoromethylene)-pregna-4,16-diene-3,20-dione in 30 ml. of an ethereal solution of diazomethane is allowed to stand at room temperature for 24 hours. One milliliter of acetic acid is then added to the mixture which is then evaporated to dryness under reduced pressure. The residue is heated gradually to 180° C. in vacuo, cooled and recrystallized from acetone:hexane to yield 1,2;6,7-bis(difluoromethylene)-16-methylpregna-4,16-diene-3,20-dione.

To a stirred solution of 5 g. of 1,2;6,7-bis(difluoromethylene)-16-methylpregna-4,16-diene-3,20-dione, in 350 ml. of methanol, is added 20 ml. of 4 N aqueous sodium hydroxide and 20 ml. of 30% hydrogen peroxide, maintaining a temperature of approximately 15° C. The solution is allowed to stand at 0° C. for 15 hours and then poured into ice water. The solid which forms is collected by filtration, washed with water, and dried to yield 1,2; 6,7-bis(difluoromethylene) - 16α,17α -oxido - 16β-methylpregn-4-ene-3,20-dione which may be further purified by recrystallization from acetone:hexane.

To a solution of 1 g. of 1,2;6,7-bis(difluoromethylene)-16α,17α-oxido - 16β - methylpregn-4-ene-3,20-dione in 10 ml. of dioxane is added 0.5 ml. of a 50% w./v. solution of hydrogen bromide in acetic acid. After being allowed to stand for 10 minutes at room temperature, the mixture is poured into water and extracted with ether.

These ethereal extracts are dried over sodium sulfate and evaporated to dryness to yield 1,2;6,7-bis(difluoromethylene)-16-methylpregn - 4 - en-17α-ol-3,20-dione which may be further purified through recrystallization from acetone:hexane.

In like manner, the 1,2-methylene-6,7-difluoromethylene-16-methylpregn - 4 - en-ol-3,20-dione compounds are prepared from 1,2-methylene-6,7-difluoromethylpregn-4-ene-17α-ol-3,20-dione.

Also prepared in accordance with the above are 1,2-methylene-6,7-difluoromethylene-16-methylene-17α-
acetoxypregn-4-ene-3,20-dione,
1,2;6,7-bis(difluoromethylene)-16-methylene-17α-ace-
toxypregn-4-ene-3,20-dione,
1,2-methylene-6,7-difluoromethylene-6-chloro-16-methyl-
ene-17α-acetoxypregn-4-ene-3,20-dione,
1,2;6,7-bis(difluoromethylene)-6-chloro-16-methylene-
17α-acetoxypregn-4-ene-3,20-dione,
1,2-methylene-6,7-difluoromethylene-6-fluoro-16-methyl-
ene-17α-acetoxypregn-4-ene-3,20-dione, and
1,2;6,7-bis(difluoromethylene)-6-fluoro-16-methylene-
17α-acetoxypregn-4-ene-3,20-dione.

The 16,17-alkylidenedioxy derivatives are prepared in accordance with the following procedure.

EXAMPLE 8

To 120 ml. of acetone containing 1 g. of pregn-4-ene-16α,17α-diol-3,20-dione are added 30 drops of 70% perchloric acid. The mixture is allowed to stand one hour at room temperature, 30 drops of pyridine are added and the solution is evaporated to dryness under reduced pressure. Thirty milliliters of water are added to the residue and this mixture is extracted several times with ethyl acetate. The combined extracts are washed to neutrality with water, dried over sodium sulfate and evaporated to dryness. The residue upon trituration with methanol yields 16α,17α-isopropylidenedioxypregn-4-ene-3,20-dione which is recrystallized from methanol.

The requisite unsaturation and methylene and halomethylene groups are then introduced in accordance with the above procedures to yield, for example, 1,2;6,7-bis(difluoromethylene)-16α,17α - isopropylidenedioxypregn - 4-ene-3,20-dione;

Similarly, the following can be prepared upon use of the appropriate starting compounds and reagents.

1,2-methylene-6,7-difluoromethylene-16α,17α-isopropyl-
idene-dioxypregn-4-ene-3,20-dione;
1,2;6,7-bis(difluoromethylene)-6-chloro-16α,17α-
isopropylidenedioxypregn-4-ene-3,20-dione;
1,2-methylene-6,7-difluoromethylene-6-chloro-16α,17α-
isopropylidenedioxypregn-4-ene-3,20-dione;
1,2;6,7-bis(difluoromethylene)-6,21-difluoro-16α,17α-
isopropylidenedioxypregn-4-ene-3,20-dione;
1,2-methylene-6,7-difluoromethylene-6,21-difluoro-
16α,17α-isopropylidenedioxypregn-4-ene-3,20-dione;
1,2;6,7-bis(difluoromethylene)-6-methyl-16α,17α-
isopropylidenedioxypregn-4-ene-3,20-dione;
1,2-methylene-6,7-difluoromethylene-6-methyl-16α,17α-
isopropylidenedioxypregn-4-ene-3,20-dione;
1,2;6,7-bis(difluoromethylene)-6-fluoro-16α,17α-
isopropylidenedioxypregn-4-ene-3,20-dione;
1,2-methylene-6,7-difluoromethylene-6-fluoro-16α,17α-
isopropylidenedioxypregn-4-ene-3,20-dione;
1,2;6,7-bis(difluoromethylene)-16α,17α-isopropylidene-
dioxypregn-21-fluoropregn-4-ene-3,20-dione;
1,2-methylene-6,7-difluoromethylene-16α,17α-isopropyl-
idenedioxypregn-21-fluoropregn-4-ene-3,20-dione;
1,2;6,7-bis(difluoromethylene)-16α,17α-(2,2-butyl-
idenedioxy)-pregn-4-ene-3,20-dione;
1,2-methylene-6,7-difluoromethylene-16α,17α-(2,2-butyl-
idenedioxy)pregn-4-ene-3,20-dione;
1,2;6,7-bis(difluoromethylene)-16α,17α-(2,2-phentyl-
idenedioxy)-pregn-4-ene-3,20-dione;

1,2-methylene-6,7-difluoromethylene-16α,17α-(2,2-pentylidenedioxy)pregn-4-ene-3,20-dione;
1,2;6,7-bis(difluoromethylene)-16α,17α-(methylphenylmethylenedioxy)pregn-4-ene-3,20-dione; and
1,2-methylene-6,7-difluoromethylene-16α,17α-(methylphenylmethylenedioxy)pregn-4-ene-3,20-dione.

Alternatively, the alkylidenedioxy grouping can be introduced into a compound which already bears the desired functionality at the C–1,2;6,7 positions.

EXAMPLE 9

A mixture of 1.34 g. of 1,2;6,7-bis(difluoromethylene)-pregn-4-ene-17α,21-diol-3,20-dione, 0.38 ml. of methanesulfonyl chloride, and 10 ml. of pyridine is allowed to stand at room temperature for 16 hours and is then poured into ice water and extracted with methylene chloride. The extracts are washed with 2 N hydrochloric acid, aqueous potassium bicarbonate solution, and saturated aqueous sodium chloride solution, dried over magnesium sulfate, and evaporated to dryness. This residue and 3.6 g. of sodium iodide is added to 150 ml. of acetone, boiled for 40 minutes and evaporated to dryness under reduced pressure. The residue is extracted with methylene chloride. These extracts are washed with saturated aqueous sodium chloride solution, dried over magnesium sulfate and evaporated to dryness. A suspension of the residue and 2.6 g. of sodium metabisulfite in 300 ml. of 80% aqueous ethanol is heated at reflux for one hour and then evaporated under reduced pressure at a temperature below 45° C. The resi- and the phases are then separated. The organic phase is washed with saturated aqueous sodium chloride solution, dried and evaporated to dryness to yield 1,2;6,7-bis-(difluoromethylene)-pregn-4-en-17α-ol-3,20-dione which may be further purified through recrystallization from acetone:hexane.

A mixture of 1 g. of 1,2;6,7-bis(difluoromethylene)-pregn-4-en-17α-ol-3,20-dione, 1 g. of p-toluenesulfonic acid monohydrate, 50 ml. of acetic acid, and 25 ml. of acetic anhydride is allowed to stand at room temperature for 24 hours and then poured into water and stirred. This mixture is then extracted with methylene chloride and these extracts are dried and evaporated to yield 1,2;6,7-bis(difluoromethylene) - 17α - acetoxypregn - 4-ene-3,20-dione which is recrystallized from acetone:ether.

Similarly, 1,2 - methylene - 6,7-difluoromethylene-17α-acetoxypregn-4-ene-3,20-dione is prepared.

EXAMPLE 10

16α,17α - oxido - 16β-methylpregna-4,6-diene - 3,20-dione is subjected to the procedure of Example 1 to yield 1,2;6,7-bis(difluoromethylene) - 16α,17α - oxido - 16β-methylpregn-4-ene-3,20-dione.

To a solution of 1 g. of 1,2;6,7-bis(difluoromethylene) 16α,17α - oxido - 16β - methylpregn-4-ene-3,20-dione in 10 ml. of dioxane is added 0.5 ml. of a 50% w./v. solution of hydrogen bromide in acetic acid. After being allowed to stand for ten minutes at room temperature, the mixture is poured into water and extracted with ether. These ethereal extracts are dried over sodium sulfate and evaporated to dryness to yield 1,2;6,7-bis(difluoromethylene)-16-methylenepregn-4-en - 17α - ol - 3,20-dione which may be further purified through recrystallization from acetone:hexane.

A mixture of 1 g. of 1,2;6,7-bis(difluoromethylene)- 16 - methylenepregn - 4 - en-17α-ol-3,20-dione, 1 g. of p-toluene-sulfonic acid monohydrate, 50 ml. of acetic acid, and 25 ml. of acetic anhydride is allowed to stand at room temperature for 24 hours and then poured into water and stirred. This mixture is then extracted with methylene chloride and these extracts are dried and evaporated to yield 1,2;6,7-bis(difluoromethylene)-16 - methylene-17α-acetoxypregn-4-ene-3,20-dione which is recrystallized from acetone:ether.

In like manner, 1,2-methylene-6,7-difluoromethylene- 16-methylene-17α - acetoxypregn-4-ene-3,20 - dione is prepared.

EXAMPLE 11

A mixture of 1 g. of 1,2;6,7-bis(difluoromethylene)- 16α - methylpregn-4-ene - 17α-ol-3,20-dione in 15 ml. of dry chloroform, which has been previously washed with concentrated sulfuric acid, and 15 ml. of a 0.7 N solution of hydrogen chloride in benzyl alcohol is allowed to stand for five days with occasional shaking. At the end of this period, the solvents are removed by steam distillation and the residue extracted with ether. The ethereal extracts are washed well with water, dried and evaporated.

A solution of 1 g. of this material in 20 ml. of ethanol, previously distilled over Raney nickel, is hydrogenated with 0.25 g. of a 10% palladium-on-charcoal catalyst for 24 hours. The catalyst is then removed by filtration through Celite diatomaceous earth and the filtrate evaporated to dryness to yield 1,2;6,7-bis(difluoromethylene)- 16α-methylpregn-4-ene-3,20-dione which may be further purified by recrystallization from acetone:hexane.

In a similar fashion, 1,2-methylene-6,7-difluoromethylene-16α-methylpregn-4-ene-3,20-dione;
1,2;6,7-bis(difluoromethylene)-16β-methylpregn-4-ene-3,20-dione;
1,2-methylene-6,7-difluoromethylene-16β-methylpregn-4-ene-3,20-dione;
1,2;6,7-bis(difluoromethylene)-6,16α-dimethylpregn-4-ene-3,20-dione;
1,2-methylene-6,7-difluoromethylene-6,16α-dimethylpregn-4-ene-3,20-dione;
1,2;6,7-bis(difluoromethylene)-6-chloro-16α-methylpregn-4-ene-3,20-dione;
1,2-methylene-6,7-difluoromethylene-6-chloro-16α-methylpregn-4-ene-3,20-dione;
1,2;6,7-bis(difluoromethylene)-6,21-difluoropregn-4-ene-3,20-diene;
1,2-methylene-6,7-difluoromethylene-6,21-difluoropregn-4-ene-3,20-dione;
1,2;6,7-bis(difluoromethylene)-6-fluoro-16-methylenepregn-4-ene-3,20-dione;
and 1,2-methylene-6,7-difluoromethylene-6-fluoro-16-methylenepregn-4-ene-3,20-dione are obtained from the corresponding 17α-hydroxy derivatives.

Alternatively, the 17β-desoxy compounds can be prepared by treating the corresponding 3-keto-Δ⁴-17-hydroxy-derivative as described above to give the 17β-desoxy intermediate followed by introduction of the C–1,2 and C–6,7, unsaturation and the bis(difluoromethylene) group or methylene-difluoromethylene group addition as described above.

EXAMPLE 12

A solution of 200 mg. of 1α,2α;6α,7α-bis(difluoromethylene)-6β-chloro-17α-acetoxy-4-ene-3,20-dione in 32 ml. of anhydrous isopropanol and 25 mg. of sodium borohydride is stirred at room temperature for 15 hours. One hundred ml. of water is added and the resulting suspension extracted several times with ether. The ether phase is dried over sodium sulfate and evaporated to dryness under reduced pressure to yield 1α,2α;6α,7α-bis(difluoromethylene)-6β-chloro-17α-acetoxypregn-4-en-3β-ol-20-one which may be further purified by recrystallization from ether.

Also prepared are the corresponding 3β-hydroxy derivatives of the other 1,2;6,7-isomers of the respective starting compounds. In like manner, the corresponding 3β-hydroxy derivatives of the other 3-keto-Δ⁴ compounds (including all isomers) prepared in accordance with the foregoing examples are prepared, for example, 1,2-methylene-6,7-difluoromethylene-6-chloro-17α-acetoxypregn-4-en-3β-ol-20-one;
1,2;6,7-bis(difluoromethylene)pregn-4-en-3β-ol-20-one;

1,2-methylene-6,7-difluoromethylenepregn-4-en-3β-ol-20-one;
1,2;6,7-bis(difluoromethylene)-16α-methylpregn-4-ene-3β,17α-diol-20-one;
1,2-methylene-6,7-difluoromethylene-16α-methylpregn-4-ene-3β,17α-diol-20-one;
1,2;6,7-bis(difluoromethylene)-16α-methyl-21-fluoropregn-4-ene-3β,17α-diol-20-one;
1,2-methylene-6,7-difluoromethylene-16α-chloro-21-fluoropregn-4-ene-3β,17α-diol-20-one;
1,2;6,7-bis(difluoromethylene)-16β-methyl-21-fluoropregn-4-ene-3β,17α-diol-20-one;
1,2-methylene-6,7-difluoromethylene-16β-methyl-21-fluoropregn-4-ene-3β,17α-diol-20-one;
1,2;6,7-bis(difluoromethylene)-16α-chloro-21-fluoropregn-4-ene-3β,17α-diol-20-one;
1,2-methylene-6,7-difluoromethylene-16α-chloro-21-fluoropregn-4-ene-3β,17α-diol-20-one;
1,2;6,7-bis(difluoromethylene)-16α,21-difluoropregn-4-ene-3β,17α-diol-20-one;
1,2-methylene-6,7-difluoromethylene-16α,21-difluoropregn-4-ene-3β,17α-diol-20-one;
1,2;6,7-bis(difluoromethylene)-6-fluoropregn-4-en-3β-ol-20-one;
1,2-methylene-6,7-difluoromethylene-6-fluoropregn-4-en-3β-ol-20-one;
1,2;6,7-bis(difluoromethylene)-pregn-4-ene-3β,17α-diol-20-one;
1,2-methylene-6,7-difluoromethylenepregn-4-ene-3β,17α-diol-20-one;
1,2;6,7-bis(difluoromethylene)-16-methylenepregn-4-ene-3β,17α-diol-20-one;
1,2-methylene-6,7-difluoromethylene-16-methylenepregn-4-ene-3β,17α-diol-20-one;
1,2;6,7-bis(difluoromethylene)-6-methylpregn-4-en-3β-ol-20-one;
1,2-methylene-6,7-difluoromethylene-6-methylpregn-4-en-3β-ol-20-one;
1,2;6,7-bis(difluoromethylene)-6-fluoropregn-4-ene-3β,17α-diol-20-one;
1,2-methylene-6,7-difluoromethylene-6-fluoropregn-4-ene-3β,17α-diol-20-one;
1,2;6,7-bis(difluoromethylene)-6-chloro-16α-methylpregn-4-ene-3β,17α-diol-20-one;
1,2-methylene-6,7-difluoromethylene-6-chloro-16α-methylpregn-4-ene-3β,17α-diol-20-one;
1,2;6,7-bis(difluoromethylene)-16β-methyl-21-chloropregn-4-ene-3β,17α-diol-20-one;
1,2-methylene-6,7-difluoromethylene-16β-methyl-21-chloropregn-4-ene-3β,17α-diol-20-one;
1,2;6,7-bis(difluoromethylene)-6,16β-dimethylpregn-4-ene-3β,17α,diol-20-one;
1,2-methylene-6,7-difluoromethylene-6,16β-dimethylpregn-4-ene-3β,17α-diol-20-one;
1,2;6,7-bis(difluoromethylene)-6,21-difluoro-16-methylenepregn-4-en-3β-ol-20-one;
1,2-methylene-6,7-difluoromethylene-6,21-difluoro-16-methylenepregn-4-en-3β-ol-20-one;
1,2;6,7-bis(difluoromethylene)-17α-(n-butyryloxy)-21-fluoropregn-4-en-3β-ol-20-one;
1,2-methylene-6,7-difluoromethylene-17α-(n-butyryloxy)-21-fluoropregn-4-en-3β-ol-20-one;
1,2;6,7-bis(difluoromethylene)-6-fluoro-16α-methyl-17α-acetoxypregn-4-en-3β-ol-20-one;
1,2-methylene-6,7-difluoromethylene-6-fluoro-16α-methyl-17α-acetoxypregn-4-en-3β-ol-20-one,
1,2;6,7-bis(difluoromethylene)-16α,17α-(isopropylidenedioxy)-pregn-4-en-3β-ol-20-one;
1,2-methylene-6,7-difluoromethylene-16α,17α-(isopropylidenedioxy)-pregn-4-en-3β-ol-20-one;
1,2;6,7-bis(difluoromethylene)-6-fluoro-16α,17α-(isopropylidenedioxy)pregn-4-en-3β-ol-20-one;
1,2-methylene-6,7-difluoromethylene-6-fluoro-16α,17α-(isopropylidenedioxy)pregn-4-en-3β-ol-20-one;
1,2;6,7-bis(difluoromethylene)-16α,17α-(methylphenylmethylenedioxy)pregn-4-en-3β-ol-20-one; and
1,2-methylene-6,7-difluoromethylene-16α,17α-(methylphenylmethylenedioxy)pregn-4-en-3β-ol-20-one.

EXAMPLE 13

A mixture of 1 g. of 1α,2α;6α,7α-bis(difluoromethylene)-6β-chloro-17α-acetoxypregn-4-en-3β-ol-20-one, 4 ml. of pyridine and 2 ml. of acetic anhydride is allowed to stand at room temperature for 15 hours. The mixture is then poured into ice water and the solid which forms is collected by filtration, washed with water and dried to yield 1α,2α;6α,7α - bis(difluoromethylene)-3β,17α-diacetoxy-6β-chloropregn-4-en-20-one which may be further purified through recrystallization from acetone:hexane.

A mixture of 2 g. of 1α,2α;6α,7α-bis(difluoromethylene)-6β-chloro-17α-acetoxypregn-4-en-3β-ol-20-one in 8 ml. of pyridine and 4 ml. of benzoyl chloride is heated at steam bath temperatures for one hour. The mixture is then poured into ice water and the solid which forms is collected by filtration, washed with water and dried to yield 1α,2α;6α,7α - bis(difluoromethylene)-3β-benzoyloxy-6β-chloro-17α-acetoxypregn-4-en-20-one which is further purified through recrystallization from methylene chloride:hexane.

A mixture of 2 g. of 1α,2α;6α,7α-bis(difluoromethylene) - 6β-chloro-17α-acetoxypregn-4-en-3β-ol-20-one in 8 ml. of pyridine and 4 ml. of adamantoyl chloride is heated at steam bath temperatures for one hour. The mixture is then poured into ice water and the solid which forms is collected by filtration, washed with water and dried to yield 1α,2α;6α,7α-bis(difluoromethylene)-3β-adamantoyloxy - 6β-chloro-17α-acetoxypregn-4-en-20-one which is further purified through recrystallization from methylene chloride:hexane.

The other 1,2;6,7-isomers corresponding to these esters are likewise prepared from their respective starting compound. In like manner, the corresponding esters of the other 3β-hydroxy compounds listed above are prepared, for example,
1,2-methylene-3β,17α-diacetoxy-6-chloro-6,7-difluoromethylenepregn-4-en-20-one;
1,2;6,7-bis(difluoromethylene)-3β-acetoxypregn-4-en-20-one;
1,2-methylene-6,7-difluoromethylene-3β-acetoxypregn-4-en-20-one;
1,2;6,7-bis(difluoromethylene)-3β-acetoxy-16α-methylpregn-4-en-17α-ol-20-one;
1,2-methylene-6,7-difluoromethylene-3β-acetoxy-16α-methylpregn-4-en-17α-ol-20-one;
1,2;6,7-bis(difluoromethylene)-3β-acetoxy-16α-methyl-21-fluoropregn-4-en-17α-ol-20-one;
1,2-methylene-6,7-difluoromethylene-3β-acetoxy-16α-methyl-21-fluoropregn-4-en-17α-ol-20-one;
1,2;6,7-bis(difluoromethylene)-3β-acetoxy-16β-methyl-21-fluoropregn-4-en-17α-ol-20-one;
1,2-methylene-6,7-difluoromethylene-3β-acetoxy-16β-methyl-21-fluoropregn-4-en-17α-ol-20-one; and so forth,
1,2;6,7-bis(difluoromethylene)-3β-benzoyloxypregn-4-en-20-one;
1,2-methylene-6,7-difluoromethylene-3β-benzoyloxypregn-4-en-20-one;
1,2;6,7-bis(difluoromethylene)-3β-benzoyloxy-16α-methylpregn-4-en-17α-ol-20-one;
1,2-methylene-6,7-difluoromethylene-3β-benzoyloxy-16α-methlylpregn-4-en-17-ol-20-one;
1,2;6,7-bis(difluoromethylene)-3β-benzoyloxy-16α-methyl-21-fluoropregn-4-en-17α-ol-20-one;
1,2-methylene-6,7-difluoromethylene-3β-benzoyloxy-16α-methyl-21-fluoropregn-4-ene-17α-ol-20-one;
1,2;6,7-bis(difluoromethylene)-3β-benzoyloxy-16β-methyl-21-fluoropregn-4-en-17α-ol-20-one,
1,2-methylene-6,7-difluoromethylene-3β-benzoyloxy-16β-methyl-21-fluoropregn-4-en-17α-ol-20-one, and so forth, 1,2;6,7-bis(difluoromethylene)-3β-adamantoyloxy-
   pregn-4-en-20-one;
1,2-methylene-6,7-difluoromethylene-3β-adamantoyloxy-
   pregn-4-en-20-one;
1,2;6,7-bis(difluoromethylene)-3β-adamantoyloxy-16α-
   methylpregn-4-en-17α-ol-20-one;
1,2-methylene-6,7-difluoromethylene-3β-adamantoyloxy-
   16α-methylpregn-4-en-17α-ol-20-one;
1,2;6,7-bis(difluoromethylene)-3β-adamantoyloxy-16α-
   methyl-21-fluoropregn-4-en-17α-ol-20-one;
1,2-methylene-6,7-difluoromethylene-3β-adamantoyloxy-
   16α-methyl-21-fluoropregn-4-en-17α-ol-20-one;
1,2;6,7-bis(difluoromethylene)-3β-adamantoyloxy-16β-
   methyl-21-fluoropregn-4-en-17α-ol-20-one;
1,2-methylene-6,7-difluoromethylene-3β-adamantoyloxy-
   16β-methyl-21-fluoropregn-4-en-17α-ol-20-one; and so
   forth.

Similarly, the corresponding 3β-propionates, -caproate, -undecanoate, -enanthate and the like esters of the above compounds can be prepared upon treatment of the respective 3β-hydroxy compound with the appropriate acid anhydride or acid chloride.

EXAMPLE 14

Two milliliters of dihydropyran are added to a solution of 1 g. of 1α,2α;6α,7α-bis(difluoromethylene)-6β-chloro-17α-acetoxypregn-4-ene-3β-ol-20-dione in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 1α,2α;6α7α-bis(difluoromethylene)- 3β -tetrahydropyran-2-yloxy-6β-chloro-17α-acetoxypregn-4-en-20-one which is recrystallized from pentane.

To a solution of 1 g. of 1α,2α;6α,7α-bis(difluoromethylene)-6β-chloro-17α-acetoxypregn-4-ene-3β-ol-20-dione in 20 ml. of benzene, is added 20 ml. of dihydrofuran. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutral, dried over anhydrous magnesium sulfate, and evaporated to dryness under reduced pressure. The oily residue crystallizes on the addition of ether to yield the 1α,2α;6α,7α-bis(difluoromethylene)-3β-tetrahydrofuran- 2 -yloxy-6β-chloro-17α-acetoxypregn-4-en-20-one.

The 3β-ethers of the other 1,2;6,7-isomers are likewise prepared. In like manner, the corresponding ethers of the other 3β-hydroxy compounds listed above are prepared, for example, 1,2-methylene-3β-tetrahydropyran-2-yloxy-6-chloro-6,7-
   difluoromethylene-17α-acetoxypregn-4-en-20-one
1,2-methylene-3β-tetrahydrofuran-2-yloxy-6-chloro-6,7-
   difluoromethylene-17α-acetoxypregn-4-en-20-one;
1,2;6,7-bis(difluoromethylene)-3β-tetrahydropyran-2-
   yloxypregn-4-en-20-one;
1,2-methylene-6,7-difluoromethylene-3β-tetrahydropyran-
   2-yloxypregn-4-en-20-one;
1,2;6,7-bis(difluoromethylene)-3β-tetrahydrofuran-2-
   yloxypregn-4-en-20-one;
1,2-methylene-6,7-difluoromethylene-3β-tetrahydrofuran-
   2-yloxypregn-4-en-20-one;
1,2;6,7-bis(difluoromethylene)-3β-tetrahydropyran-2-
   yloxy-16α-methylpregn-4-en-17α-ol-20-one;
1,2-methylene-6,7-difluoromethylene-3β-tetrahydropyran-
   2-yloxy-16α-methylpregn-4-en-17α-ol-20-one;
1,2;6,7-bis(difluoromethylene)-3β-tetrahydrofuran-2-
   yloxy-16α-methylpregn-4-en-17α-ol-20-one;
1,2-methylene-6,7-difluoromethylene-3β-tetrahydrofuran-
   2-yloxy-16α-methylpregn-4-en-17α-ol-20-one;
and so forth.

What is claimed is:
1. The compound of one of the formulas:

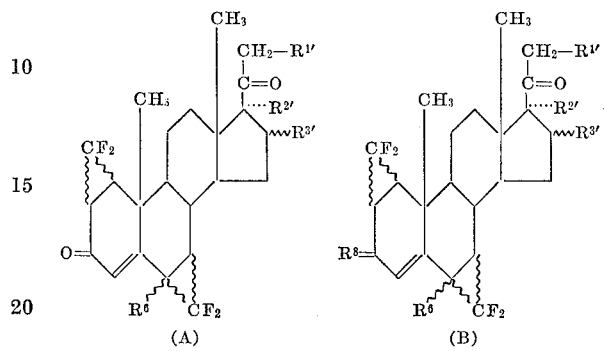

wherein:
  $R^{1'}$ is fluoro or chloro;
  $R^{2'}$ is hydrogen, hydroxy or a hydrocarbon carboxylic acyloxy group of less than 12 carbon atoms;
  $R^{3'}$ is hydrogen, methylene, α-methyl, β-methyl or, when taken together with $R^{2'}$, the group.

in which A is hydrogen or alkyl of up to eight carbon atoms and B is hydrogen or alkyl or aryl of up to eight carbon atoms;
  $R^6$ is hydrogen, methyl, chloro or fluoro; and
  $R^8$ is the group

in which R is hydrogen, tetrahydrofuran-2-yl, tetrahydropyran-2-yl or a hydrocarbon carboxylic acyl group of less than 12 carbon atoms.

2. The compound claimed in claim 1 wherein $R^6$ is hydrogen, chloro or fluoro.
3. The compound of Formula A of claim 1 wherein $R^{2'}$ is acetoxy, $R^{3'}$ is methylene and $R^6$ is hydrogen.
4. The compound of Formula A of claim 1 wherein $R^{2'}$ is acetoxy, $R^{3'}$ is methylene and $R^6$ is chloro.
5. The compound of Formula A of claim 1 wherein $R^{2'}$ is acetoxy, $R^{3'}$ is methylene and $R^6$ is fluoro.
6. The compound of Formula A of claim 1 wherein $R^{2'}$ is acetoxy, $R^{3'}$ is hydrogen and $R^6$ is hydrogen.
7. The compound of Formula A of claim 1 wherein $R^{2'}$ is acetoxy, $R^{3'}$ is hydrogen and $R^6$ is chloro.
8. The compound of Formula A of claim 1 wherein $R^{2'}$ is acetoxy, $R^{3'}$ is hydrogen and $R^6$ is fluoro.
9. The compound of one of the formulas:

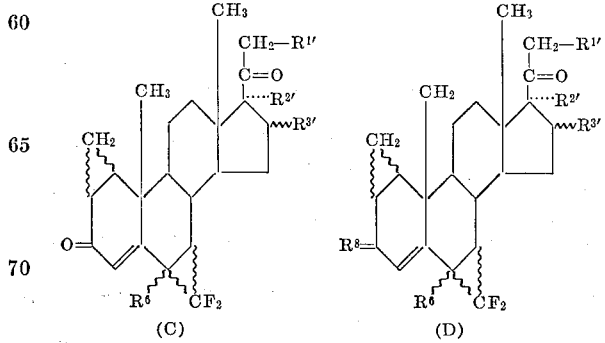

wherein:
  $R^{1'}$ is fluoro or chloro;

23

R$^{2\prime}$ is hydrogen, hydroxy or a hydrocarbon carboxylic acyloxy group of less than 12 carbon atoms;
R$^{3\prime}$ is hydrogen, methylene, α-methyl, β-methyl or, when taken together with R$^{2\prime}$, the group

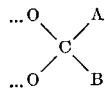

in which A is hydrogen or alkyl of up to eight carbon atoms and B is hydrogen or alkyl of up to eight carbon atoms;
R$^6$ is hydrogen, methyl, chloro or fluoro; and
R$^8$ is the group

in which R is hydrogen, tetrahydrofuran-2-yl, tetrahydropyran-2-yl or a hydrocarbon carboxylic acyl group of less than 12 carbon atoms.

10. The compound claimed in claim 9 wherein R$^6$ is hydrogen, chloro or fluoro.
11. The compound of Formula C of claim 9 wherein R$^{2\prime}$ is acetoxy, R$^{3\prime}$ is methylene and R$^6$ is hydrogen.
12. The compound of Formula C of claim 9 wherein R$^{2\prime}$ is acetoxy, R$^{3\prime}$ is methylene and R$^6$ is chloro.
13. The compound of Formula C of claim 9 wherein R$^{2\prime}$ is acetoxy, R$^{3\prime}$ is methylene and R$^6$ is fluoro.
14. The compound of Formula C of claim 9 wherein R$^{2\prime}$ is acetoxy, R$^{3\prime}$ is hydrogen and R$^6$ is hydrogen.
15. The compound of Formula C of claim 9 wherein R$^{2\prime}$ is acetoxy, R$^{3\prime}$ is hydrogen and R$^6$ is chloro.
16. The compound of Formula C of claim 9 wherein R$^{2\prime}$ is acetoxy, R$^{3\prime}$ is hydrogen and R$^6$ is fluoro.
17. The compound of one of the formulas:

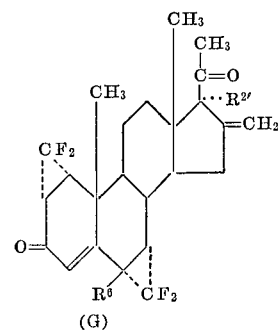

wherein:
R$^{2\prime}$ is hydrogen, hydroxy or a hydrocarbon carboxylic acyloxy group of less than 12 carbon atoms; and
R$^6$ is hydrogen, methyl, chloro or fluoro.

18. The compound of Formula G of claim 17 wherein R$^{2\prime}$ is acetoxy and R$^6$ is hydrogen.
19. The compound of Formula G of claim 17 wherein R$^{2\prime}$ is acetoxy and R$^6$ is chloro.
20. The compound of Formula G of claim 17 wherein R$^{2\prime}$ is acetoxy and R$^6$ is fluoro.
21. The compound of Formula H of claim 17 wherein R$^{2\prime}$ is acetoxy and R$^6$ is hydrogen.
22. The compound of Formula H of claim 17 wherein R$^{2\prime}$ is acetoxy and R$^6$ is chloro.
23. The compound of Formula H of claim 17 wherein R$^{2\prime}$ is acetoxy and R$^6$ is fluoro.

24

24. The compound of one of the formulas:

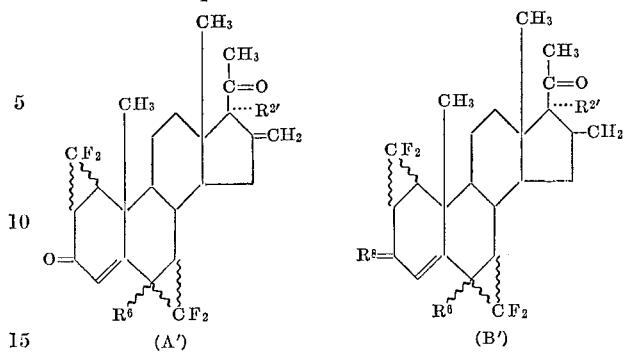

wherein:
R$^{2\prime}$ is hydrogen, hydroxy or a hydrocarbon carboxylic acyloxy group of less than 12 carbon atoms;
R$^6$ is hydrogen, methyl, chloro or fluoro; and
R$^8$ is the group

in which R is hydrogen, tetrahydrofuran-2-yl, tetrahydropyran-2-yl or hydrocarbon carboxylic acyl group of less than 12 carbon atoms.

25. The compound of Formula A′ of claim 24 wherein R$^{2\prime}$ is acetoxy, and R$^6$ is hydrogen.
26. The compound of Formula A′ of claim 24 wherein R$^{2\prime}$ is acetoxy and R$^6$ is chloro.
27. The compound of Formula A′ of claim 24 wherein R$^{2\prime}$ is acetoxy and R$^6$ is fluoro.
28. The compound of one of the formulas:

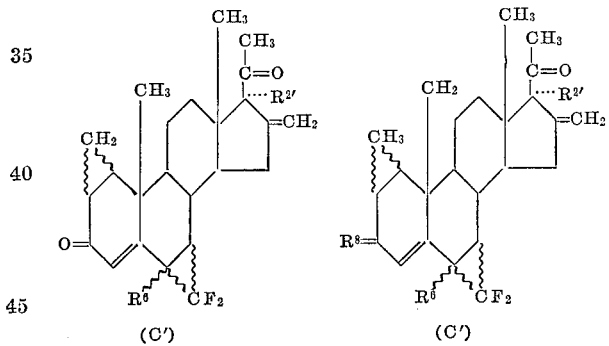

wherein:
R$^{2\prime}$ is hydrogen, hydroxy or a hydrocarbon carboxylic acyloxy group of less than 12 carbon atoms;
R$^6$ is hydrogen, methyl, chloro or fluoro; and
R$^8$ is the group

in which R is hydrogen, tetrahydrofuran-2-yl, tetrahydropyran-2-yl or a hydrocarbon carboxylic acyl group of less than 12 carbon atoms.

29. The compound of Formula C′ of claim 28 wherein R$^{2\prime}$ is acetoxy and R$^6$ is hydrogen.
30. The compound of Formula C′ of claim 28 wherein R$^{2\prime}$ is acetoxy and R$^6$ is chloro.
31. The compound of Formula C′ of claim 28 wherein R$^{2\prime}$ is acetoxy and R$^6$ is fluoro.

References Cited

UNITED STATES PATENTS 3,047,566  7/1962  Godtfredsen et al.
3,200,113  8/1965  Christiansen et al.
3,243,434  3/1966  Krakower.

HENRY A. FRENCH, Primary Examiner

U.S. Cl. X.R.

260—239.55, 397.3, 397.47, 999

UNITED STATES PATENT OFFICE
CERTIFICATE OF CORRECTION

Patent No. 3,557,160          Dated January 19, 1971

Inventor(s) Colin C. Beard, Alexander D. Cross

It is certified that error appears in the above-identified patent and that said Letters Patent are hereby corrected as shown below:

Column 1, line 63, "ecah" should be -- each --.
Column 4, line 7, delete the second occurence of "which".
Column 4, line 64, "dichlroacetic" should be -- dichloroacetic --.
Column 4, line 75, "carobn" should be -- carbon --.
Column 5, line 55, "3-keto-$\Delta^{14}$-diene" should be -- 3-keto-$\Delta^{1,4}$-diene --.
Column 5, line 66, "staring" should be -- starting --.
Column 6, line 16, "grouping" should be -- groupings --.
Column 6, line 59, "chlorinal" should be -- chloranil --.
Column 7, line 3, "2-iodo" should be -- 21-iodo --.
Column 7, line 38, "3-keto-substituted-" should be -- 3-keto-6-substituted- --.
Column 10, line 7, after "further" and before "purified" delete "even".
Column 13, line 26, "pregna-14,-diene-" should be -- pregna-1,4-diene- --.
Column 14, line 7, "alumin," should be -- alumina, --.
Column 14, line 25, "acetoxypregn-4-3,20-dione;" should be -- acetoxypregn-4-ene-3,20-dione; --.
Column 16, line 3, "ene)-16-methylpregn-" should be -- ene)-16-methylenepregn- --.
Column 16, line 7, "ene-16-methylpregn-4-en-ol-3,20-dione" should be -- ene-16-methylenepregn-4-en-17α-ol-3,20-dione --
Column 16, line 8, "1,2-methylene-6,7-difluoromethylpregn-should be -- 1,2-methylene-6,7-difluoromethylenepregn- --.
Column 16, line 74, "1,2;6,7-bis(difluoromethylene)-16α,17(2,2-phentyl-" should be -- 1,2;6,7-bis(difluoromethylene)-16α,17α-(2,2-pentyl- --.
Column 17, lines 30 to 31, after "The resi-" (line 30) and before "and the phases" (line 31), insert -- due is partitio between water and methylene chloride --.

UNITED STATES PATENT OFFICE
CERTIFICATE OF CORRECTION

Patent No. 3,557,160  Dated January 19, 1971

Inventor(s) _____ Page -2-

It is certified that error appears in the above-identified patent and that said Letters Patent are hereby corrected as shown below:

Column 18, line 38, "diene;" should be -- dione; --.
Column 19, line 9, "16α-chloro-21-" should be -- 16α-meth 21- --.
Column 20, line 67, "16α-methlylpregn-4-en-17-ol-20-one;" should be -- 16α-methylpregn-4-en-17α-ol-20-one; --.
Column 24, Claim 24, formula (B') should appear as follow

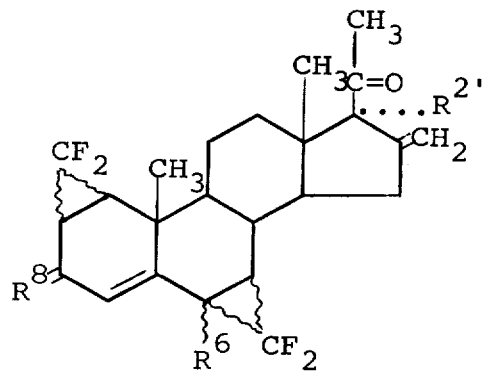

(B')

Signed and sealed this 4th day of July 1972.

(SEAL)
Attest:

EDWARD M. FLETCHER, JR.        ROBERT GOTTSCHALK
Attesting Officer              Commissioner of Patents

FORM PO-1050 (10-69)